United States Patent
Raneri et al.

(10) Patent No.: US 8,484,294 B1
(45) Date of Patent: Jul. 9, 2013

(54) SYSTEM AND METHOD FOR VERIFIED DELIVERY OF E-MAIL MESSAGES

(75) Inventors: Michael Raneri, San Francisco, CA (US); Paul Chisaki, Fremont, CA (US); John Funk, Evergreen, CO (US)

(73) Assignee: Charles Schwab & Co., Inc., San Francisco, CA (US)

( * ) Notice: Subject to any disclaimer, the term of this patent is extended or adjusted under 35 U.S.C. 154(b) by 2733 days.

(21) Appl. No.: 09/847,753

(22) Filed: May 2, 2001

Related U.S. Application Data

(60) Provisional application No. 60/271,182, filed on Feb. 21, 2001.

(51) Int. Cl.
*G06F 15/16* (2006.01)

(52) U.S. Cl.
USPC ........... 709/206; 709/201; 709/203; 709/218; 709/219; 709/245

(58) Field of Classification Search
USPC .................. 709/201, 203, 218, 219, 206, 245
See application file for complete search history.

(56) References Cited

U.S. PATENT DOCUMENTS

| | | | | | |
|---|---|---|---|---|---|
| 5,793,497 | A | * | 8/1998 | Funk | 358/402 |
| 6,119,171 | A | * | 9/2000 | Alkhatib | 709/245 |
| 6,157,705 | A | * | 12/2000 | Perrone | 379/88.01 |
| 6,208,426 | B1 | * | 3/2001 | Saito et al. | 358/1.15 |
| 6,321,267 | B1 | * | 11/2001 | Donaldson | 709/229 |
| 6,434,600 | B2 | * | 8/2002 | Waite et al. | 709/206 |
| 6,477,647 | B1 | * | 11/2002 | Venkatraman et al. | 713/193 |
| 6,484,151 | B1 | * | 11/2002 | O'Shaughnessy | 705/36 |
| 6,615,188 | B1 | * | 9/2003 | Breen et al. | 705/37 |
| 6,684,248 | B1 | * | 1/2004 | Janacek et al. | 709/225 |
| 6,986,037 | B1 | * | 1/2006 | Assmann | 713/155 |
| 7,136,898 | B1 | * | 11/2006 | Chisaki et al. | 709/206 |
| 2002/0144154 | A1 | * | 10/2002 | Tomkow | 713/201 |
| 2003/0033212 | A1 | * | 2/2003 | Sandhu et al. | 705/26 |

* cited by examiner

*Primary Examiner* — Carl Colin
*Assistant Examiner* — Mohammad A Siddiqi
(74) *Attorney, Agent, or Firm* — Innovation Partners; Charles E. Gotlieb

(57) ABSTRACT

A system and method delivers e-mail messages if it can validate the master name server, MX record, or both for the mail domain in the address of the message. Otherwise, the message may be sent by alternate means, such as a message printed and mailed.

25 Claims, 3 Drawing Sheets

SYSTEM AND METHOD FOR VERIFIED DELIVERY OF E-MAIL MESSAGES

RELATED APPLICATION

This application claims the benefit of U.S. Provisional Application No. 60/271,182 entitled, "SYSTEM AND METHOD FOR VERIFIED DELIVERY OF E-MAIL MESSAGES" filed on Feb. 21, 2001 by Michael Raneri and Paul Chisaki and is hereby incorporated herein by reference in its entirety.

FIELD OF THE INVENTION

The present invention is related to computer software and more specifically to computer software for e-mail delivery.

BACKGROUND OF THE INVENTION

When a security is bought or sold for a client by a broker-dealer, the broker-dealer must send a confirmation of the trade to its client. A conventional confirmation is a paper record of the trade mailed to the client using the postal service containing a brief summary of the transaction, including, but not limited to, a description of the security traded, the type of transaction, the quantity bought or sold, the date of execution, and the unit price. For each transaction the broker-dealer executes, a separate confirmation is mailed, although multiple confirmations may share the same envelope, and a transaction requested by a client may be executed in several transactions by the broker-dealer.

Confirming a trade can benefit the client by informing the client that a trade was properly performed. If the trade was made pursuant to an order to sell or buy at a particular price, referred to as a "limit order", the client may not know that a trade has occurred pursuant to the order until the confirmation is received. Confirming a trade can also benefit the client by allowing the client to correct errors that may have been made in execution. Thus, confirmations are mailed quickly, such as within three days after the trade was executed. Confirming a trade can also provide a recognized source of tax information: for example, the confirmation can describe the basis amount in a stock held by a client.

There are several problems with mailing confirmations. First, the process is expensive. Mailing confirmations involves not only generation of documents, but also folding, inserting into envelopes, and affixing postage. Because millions of securities transactions occur per day, millions of confirmations must be sent; multiplied accordingly, the labor and postage costs of mailing each individual confirmation accrue to a high total cost for the broker-dealer.

Second, until the client receives the confirmation of the trade, he may not know the exact price at which or date at which the trade was executed. With a few days added for mail delays, nearly a week can pass before the client is notified of the trade. Some clients find this length unacceptably long, particularly if it can affect their actions with respect to other trades.

If the transaction occurs over the Internet, the client might be able to access information about the trade through a website, but this method of retrieval would require connecting to the site, logging on, navigating the site, and requesting the appropriate information, a cumbersome and time-consuming process. If the trade is executed pursuant to a limit order, the client would have to repeatedly check the status on the website, a cumbersome process. Because each such transaction costs the broker-dealer money and uses resources, such as those of a server, such repeated checking drives up the costs and occupies resources that may be put to another use or not needed if the client did not check the status repeatedly. Furthermore, the information located via the web could not be used as evidence of the cost basis in the security for income tax purposes.

One possible solution to the problem would be to e-mail confirmations of trades. Such an approach would reduce the costs and delays associated with mailing the confirmation, provide a nearly instantaneous confirmation and prevent repeated checking via a website. However, if the e-mail message is not received, the intended recipient of the e-mail may not be able to respond to and correct a mistake or an unauthorized trade that could have been promptly corrected.

There are several reasons an e-mail message may not be received by the intended recipient. For example, some e-mail messages are received by an intermediate server before they are forwarded on to the recipient's server. The intermediate server may be a backup server that operates to accept messages for the recipient's server when the recipient's server is not available. If the intermediate server mishandles the message, it may not be forwarded to the intended recipient.

Another reason an e-mail message may not be received by the intended recipient is due to misdirection of the e-mail message, for example because of a mistake or the activities of a hacker. When a sending system sends an e-mail message, one or more servers, each known as a name server, is used to translate the mail domain (the portion of the e-mail address to the right of the '@' sign) into an Internet Protocol (IP) address of a master name server for the recipient. The master name server is then used to identify the IP addresses of one or more specific mail servers that can receive the e-mail message and provide the message to the recipient.

If any of these servers has incorrect information, the e-mail message may not be delivered to its intended recipient. This could arise because of a mistake in setting up these servers or because a hacker had replaced the IP address of his or her own server in place of the IP address of the intended recipient's domain name server or had replaced the IP address of the specific mail server to which the message is sent with the IP address of the hacker's mail server. The message would then be sent to the hacker's mail server in place of the mail server that will forward the message to the recipient. If the hacker was the party who caused an unauthorized trade to be executed, the misdirection of the e-mail confirmation could allow the hacker extra time before his or her actions were detected.

What is needed is a system and method that can prevent an e-mail message from being sent to an intermediate server and can prevent an e-mail message from being delivered to an incorrect recipient server.

SUMMARY OF INVENTION

A system and method receives an e-mail message, requests information about the server to which the message should be sent and compares the information received in response to the request with information known about the domain to which the message is to be sent. If some or all of the response does not match some or all of the information known about the domain or is otherwise unacceptable, the information in the e-mail message may be sent through alternate means, for example, by printing and mailing it either in place of, or in addition to, sending the e-mail message.

DETAILED DESCRIPTION OF A PREFERRED EMBODIMENT

A. Conventional Computer System.

Figure 1:
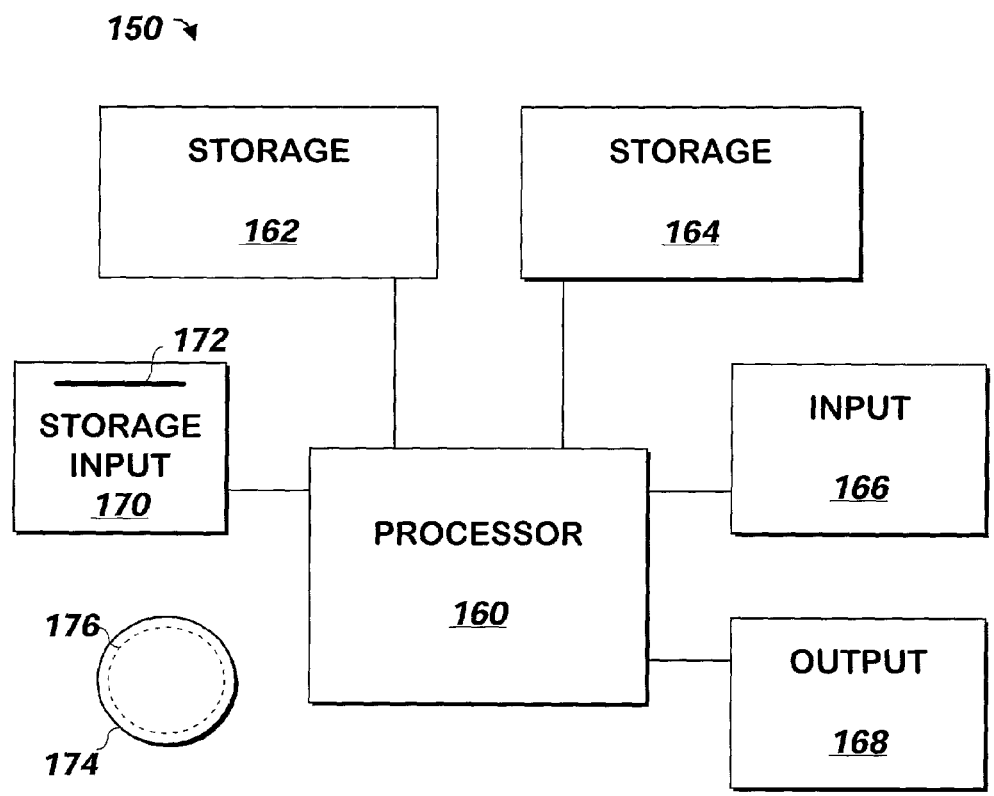
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the conventional Solaris operating system commercially available from Sun Microsystems of Mountain View, Calif., although other systems may be used.

B. Executing the Trade.

Figure 2:
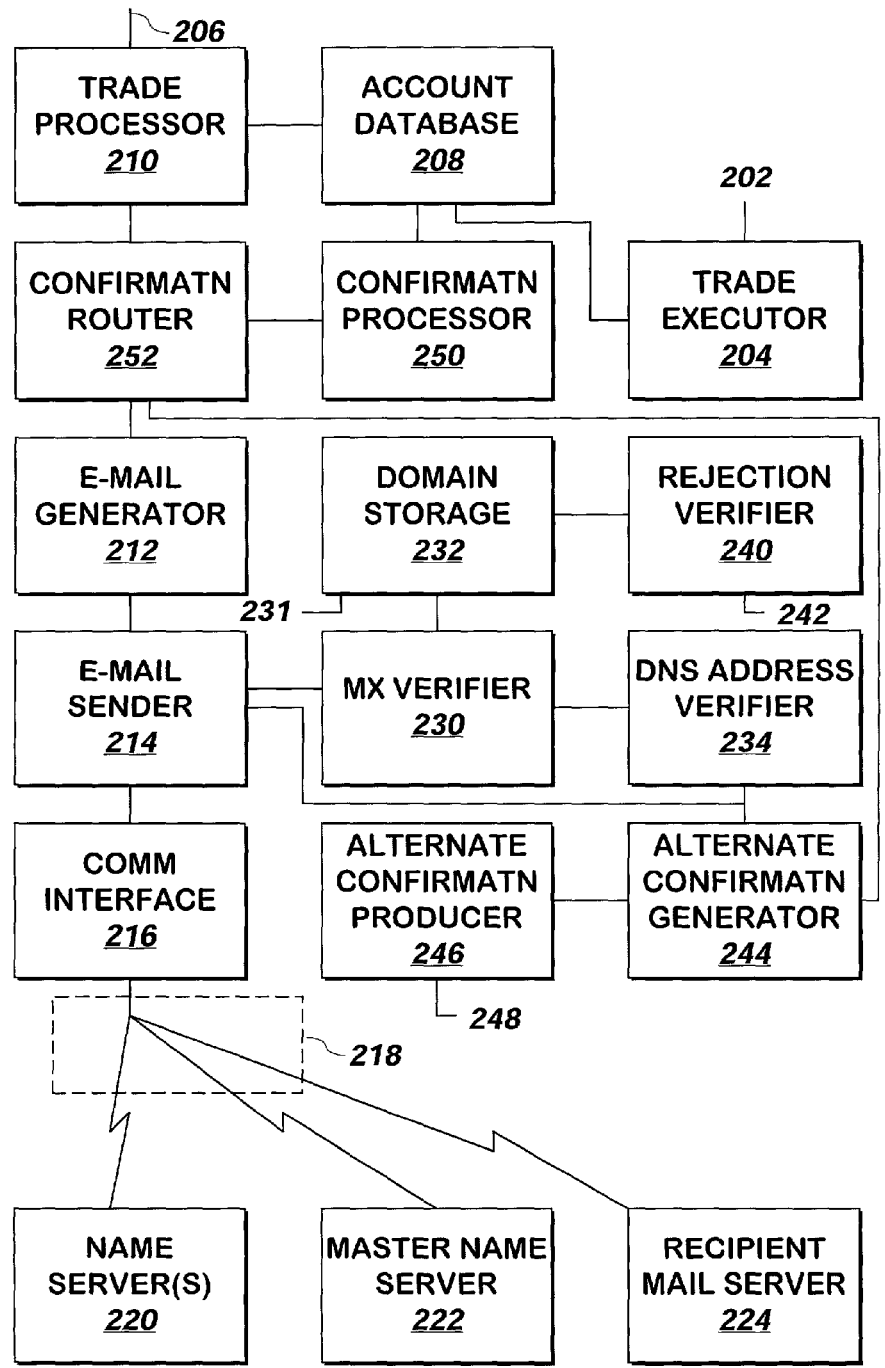
FIG. 2 is a block schematic diagram of a system for e-mail delivery according to one embodiment of the present invention.

Referring now to FIG. 2, a system for sending e-mail messages is shown according to one embodiment of the present invention. Although the description below refers to e-mail messages containing trade confirmations, the system of the present invention may be used for any type of e-mail message.

In one embodiment, the system of the present invention includes a trade processor 210 that accepts clients' requests for securities transactions at input 206. Input 206 may be connected to one or more public networks, such as the Internet, private networks, such as an internal data entry system on a local area network, a telephone network for executing trades by DTMF tones or by speech or any of these. A client request includes one or more client identifiers (such as name and/or account number), a description of the security to be traded, the type of transaction, and the quantity to buy or sell. The request may include a designation to perform the trade at the market price, at a later time such as at the end of a day (for example, to trade a mutual fund) or to perform the trade upon the occurrence of a condition, such as a price exceeding or being below a specified target.

In one embodiment, trade processor 210 adds to the request a unique identifier identifying the request or the trade and stores the request and the identifier into account database 208. Account database 208 is a conventional database such as the conventional DB2 product commercially available from IBM Corporation of White Plains, New York, and may hold general account information about each client, and information about requests and trades. General account information might include a client's preferred method of being sent confirmations of securities transactions (the confirmation preference) and/or the client's e-mail address. Trade processor 210 inserts into account database 208 a new record containing data about the request such as the client number and the type and parameters of the request such as number of shares and threshold price.

Trade executor 204 scans the requests and compares the requests with market information it receives at input/output 202 and rules it internally stores, such as allowing trading of mutual funds only during a time window, to determine whether to execute the request. If trade executor 204 executes the request, it signals the execution at input/output 202 for fulfillment and receives a confirmation at input/output 202. Trade executor 204 then records information about the trade, such as date and time and price per share, in the record in account database 208 corresponding to the request from which the trade was generated.

Confirmation processor 250 scans the records in account database that have been executed as trades. For each such record, confirmation processor 250 retrieves the information about the trade and matches the account number in the record to a set of account information corresponding to that account number in account database 208. In one embodiment, such information includes any or all of the mailing address for the client, the e-mail address of the client, and a preference for whether trade confirmations should be delivered by e-mail or by postal mail or another manner of delivery. Confirmation processor sends some or all of this information as a transaction object to confirmation router 252.

C. Routing the Confirmation

Confirmation router 252 scans the transaction object to determine whether the client wishes to be sent e-mail confirmations and whether an e-mail address is available. If either condition is not met, confirmation router 252 sends the transaction object to alternate confirmation generator 244. In one embodiment, if both conditions above are met, confirmation router 252 forwards the transaction object to e-mail generator 212, for use as described below.

(Although the discussion below describes a serial process of e-mail generator building an e-mail message and then other portions of the system performing a verification process, other embodiments allow this processing to be performed in parallel. In such embodiment, confirmation router 252 may forward the transaction object to e-mail sender in addition to forwarding it to e-mail generator 212. Still other embodiments allow the verification process to occur)

Alternate confirmation generator 244 uses some or all of the general account information in the transaction object (or retrieved using an identifier such as a customer number in the transaction object), such as the client's mailing address, as well as the trade number and transaction data to format and generate a confirmation in a form of communication other than e-mail, for example, one that may be printed on a piece of paper. Alternate confirmation generator 244 sends the confirmation to alternate confirmation producer 246 which provides at output 248 a form of confirmation other than e-mail, such as a conventional confirmation in printed form.

D. Building the E-Mail Message

E-mail generator 212 scans the transaction object for information to be included in the e-mail confirmation, such as e-mail address, trade number, type of transaction, quantity, and unit price. E-mail generator 212 may use some of the extracted information to make calculations to be included in an e-mail confirmation, for example, quantity multiplied by unit price for the extended amount. In one embodiment, these calculations may already have been made by trade processor 210 and included in the transaction object. After completing its scan and making any necessary calculations, e-mail generator 212 creates a conventional e-mail message containing information from the transaction object as a confirmation in a format compatible with other e-mail systems and passes it to e-mail sender 214 along with the transaction object. Formats of e-mail messages are described in Wood, *Programming Internet E-mail* (1999, O'Reilly & Associates, Inc., Sebastopol, Calif.)(ISBN: 1-56592-479-7), which is hereby incorporated by reference in its entirety.

E. Obtaining the MX Record to Use to Send the E-Mail Message

E-mail sender 214 uses the e-mail address in the e-mail confirmation received from e-mail generator 212 (or confirmation router 252) to identify the domain name of the addressee of the e-mail confirmation. The domain name of an e-mail address is the portion of the e-mail address to the right of the '@' sign. Thus, the e-mail address ceg@i-plaw.com has a mail domain of 'i-plaw.com'. E-mail sender 214 uses the domain name it identifies to request the IP address of the master name server for that domain by sending a request to one or more name servers 220 using conventional techniques. Each request is sent via communications interface 216, which is a TCP/IP compatible or other communications interface coupled to the Internet 218. Each name server 220 will respond with the IP address of another name server 220 or the IP address of the master name server 222 for the domain. Once the master name server 222 has been located, e-mail sender 214 requests the MX record from the master name server 222 via communications interface 216.

Master name server 222 responds with an MX record that identifies the names and IP addresses of mail exchangers, which are a type of server that receive messages for the indicated domain. MX records are described in Liu, DNS and BIND, (1998, O'Reilly & Associates; ISBN 1565925122) and this book is hereby incorporated by reference in its entirety. E-mail sender 214 sends the domain name and the IP address of the master name server 222 to DNS address verifier 234 for verification of the IP address of the master name server for the domain and sends the domain name and the MX record to e-mail MX verifier 230 for verification of the IP addresses of the mail exchangers for the domain as described below.

F. Storage of Acceptable Master Name Server IP Addresses and Acceptable Mail Exchanger IP Addresses.

In one embodiment, verification of the IP address of the master name server 222 and the mail exchangers are performed by comparing the IP addresses received against a database of the IP addresses of approved master domain servers and acceptable mail exchangers for each of several domains. This database is stored in domain storage 232, as will now be described.

In one embodiment, domain storage 232 is a conventional database containing records, with each record containing the name of a domain, IP addresses of one or more master name servers for the domain, and IP addresses of a set of one or more acceptable mail exchangers for the domain.

In one embodiment, each record is manually entered by an operator via input/output 231 coupled to a conventional keyboard/monitor/mouse combination. The approved IP address of the master name server or servers may be located from the Whois entry at Network Solutions at www.networksolutions.com/cgi-bin/whois/whois, which may provide several, and all of which may be approved. The list of mail exchangers may be obtained via a request to the master name server for an MX record that is performed by domain storage 232 (similar to the request for the MX record request performed by e-mail server described in more detail below) via communication interface 216, and the operator of the domain contacted to verify the accuracy of the mail servers and to identify whether each such server is under the control of the operator of the domain.

Mail exchangers not under the control of the operator of the domain are intermediate servers, which in one embodiment, are viewed as not acceptable, and therefore are not entered into the list of acceptable mail exchangers for the record for that domain in domain storage 232. Also unacceptable are mail exchangers for which the operator of the domain describes as not correct. The remaining mail exchangers are viewed as acceptable, and so the IP address of these mail exchangers are manually entered in the record for that domain via input/output 231. Although the manual process above may be used, an automatic process described below may be used in place of, or in addition to, the manual process described above.

Although there are a large number of possible domains, a relatively few domains may be domains in the e-mail addresses of many, if not most, clients of a broker-dealer. Thus, a manual process can protect many of the clients of a broker-dealer without an unreasonable amount of effort.

F. Verification of the IP Address of the Master Name Server and the Selected Mail Exchanger When provided by e-mail sender 214 as described above, DNS address verifier 234 receives the domain name and IP address of the master name server and checks to see if the IP address is approved for the domain name in domain storage 232. DNS address verifier 234 locates the record in domain storage 232 corresponding to the domain name and determines if any of the one or more approved IP addresses for the master name server in the record for that domain matches the IP address it received from e-mail sender 214, and signals e-mail sender 214 with the determination.

In one embodiment, if the IP address received by DNS address verifier 234 does not match any of the approved addresses of the master name servers for the domain stored in domain storage 232, DNS address verifier 234 stores in the domain record in domain storage 232 the IP address it received for approval at a later time as described below. If no record for the domain was stored in domain storage 232, DNS address verifier creates the record and stores the IP address for approval. DNS address verifier 234 then returns a message to e-mail sender that identifies whether the IP address is approved, whether it is not approved or whether no record existed for the domain in domain storage 232.

E-mail MX verifier 230 receives the MX record and the domain name from e-mail sender 214 as described above and compares the IP addresses of the mail exchangers in the MX record with the IP addresses of the acceptable mail exchangers stored in the record in domain storage 232 for that domain. In one embodiment, E-mail MX verifier removes from the MX record the mail exchangers that are not acceptable (or marks them in the MX record as not acceptable, but leaves them in the record), and inserts them into the record for the domain in domain storage 232 for acceptance as described below. The MX record is then returned to e-mail sender 214.

In one embodiment, IP addresses of mail exchangers that are not acceptable as described herein are stored in the record for a domain as nonapproved mail exchangers to allow their differentiation from those that have not been encountered before. If E-mail MX verifier 230 identifies an IP address of a mail exchanger that is not approved, it checks the set of nonapproved mail exchanger IP addresses and IP addresses waiting for approval, and only adds the IP address to the record for approval if the IP address is not in the set of nonapproved IP addresses or IP addresses waiting for approval. In one embodiment, DNS address verifier 234 uses the same approach, by storing IP addresses of the master name server in the record for the domain in domain storage 232 after comparison with a set of nonapproved and waiting-for-approval IP addresses.

If e-mail sender 214 receives an indication from DNS address verifier 234 that the IP address of the master name server is not approved or receives an empty MX record from e-mail MX verifier 230 (or all of the mail exchangers are marked as not acceptable), E-mail sender 214 sends the transaction record to alternate confirmation generator 244 for generation of an alternate confirmation as described above. In one embodiment, if no record in domain storage 232 corresponded to the IP address of the master name server, e-mail sender sends the e-mail confirmation as described below, but also sends the transaction record to alternate receipt generator 244 so that both types of confirmation messages are generated.

If the IP address of the master name server is approved and at least one mail exchanger IP address is acceptable, e-mail sender 214 sends the confirmation generated by e-mail generator 212 to the highest-priority approved mail exchanger as indicated by the MX record and marks the mail exchanger as having been used. Ties in priority are broken randomly. If an error occurs in transmission, e-mail sender 214 retries a number of times from 0 to 3 times, and if it is not successful, e-mail sender 214 marks in the MX record that mail exchanger as having been used and selects the highest priority mail exchanger not marked as having been used from those approved as described above and attempts to send the message, continuing down the list of mail exchangers until transmission is successful or no more mail exchangers approved but unused remain. If no more mail exchangers approved but unused remain, e-mail sender 214 sends the transaction object to alternate confirmation generator 244 for generation and transmission of an alternate confirmation using conventional techniques.

Recipient mail exchanger 224 receives e-mail messages for the domain identified as described above and contains a conventional mail transfer agent. Although only one recipient mail server is shown in FIG. 2, there may be many other potential recipient mail exchangers.

In one embodiment, a system administrator may use rejection verifier 240 via input/output 242 coupled to a conventional keyboard/monitor/mouse combination to approve or accept new IP addresses stored in domain storage 232 as described above. Approval or acceptance may occur using the same techniques as were described above for manual entry of the records in domain storage 232, and the system administrator indicates approval/acceptance or rejection/non acceptance of the IP address to rejection verifier 240 which marks the IP address as approved/accepted or rejected/not accepted.

In one embodiment, an automatic verification process is used. In such embodiment, IP addresses added for verification to the domain record in domain storage 232 are timestamped by DNS address verifier 234 and MX record verifier 230 at the time of insertion into the domain record in domain storage 232. When MX verifier 230 or DNS address verifier 234 check the IP addresses as described above, if the address being checked matches an address awaiting approval, if an amount of time, such as 24 hours, has elapsed from the timestamp, the IP addresses are assumed valid and MX verifier 230 and DNS address verifier 234 will return an indication that the addresses are valid as described above.

In one embodiment, alternate confirmations may also be sent via alternate confirmation generator 244 as described above until the IP addresses for the mail servers are manually verified as described above, or until a certain period of time after the IP addresses have been automatically entered, such as 24 hours. The second case assumes that after a certain period such as 24 hours, the operator of the website would have caught any unauthorized change to the IP address and so sending the alternate confirmation is no longer necessary after that time.

In one embodiment, an indication of all confirmations sent, by e-mail or alternative means, are recorded in account database 208 by e-mail sender 214. Account database 208 stores with the transaction data information about how and when confirmations for each transaction were sent to the client. When an e-mail confirmation is sent, e-mail sender 214 passes the transaction object along with the date and time and other information related to completion of sending of the e-mail message to account database 208 to be recorded with the request record in account database 208. When alternate receipt generator 244 creates a confirmation, account database 208 receives the transaction object and the date and time of sending from alternate receipt generator 244 and account database 208 records this information with the request record.

Figure 3:
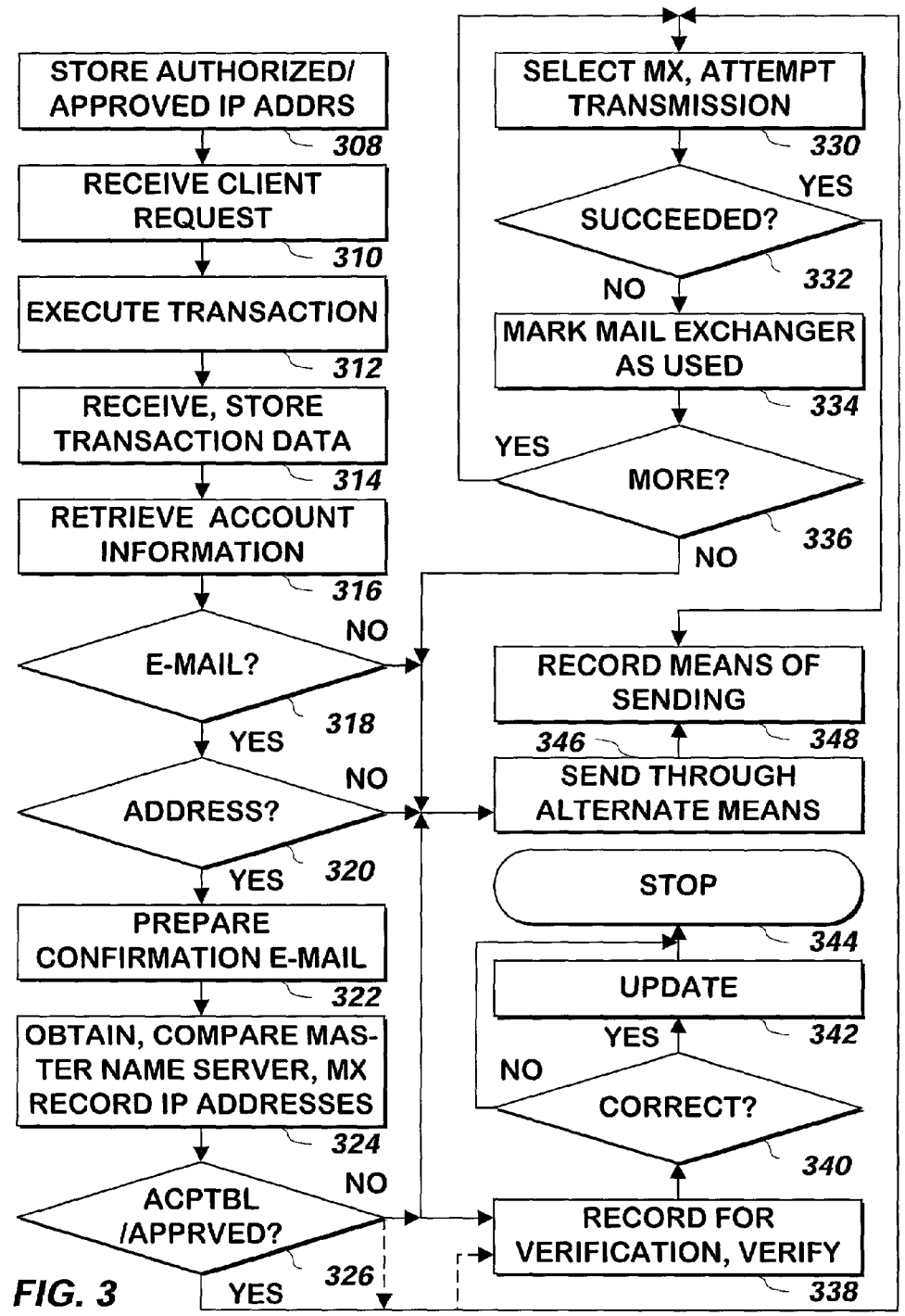
FIG. 3 is a flowchart illustrating a method of e-mail delivery according to one embodiment of the present invention.

Referring now to FIG. 3, a method of delivering e-mail messages is shown according to one embodiment of the present invention. One or more approved master server IP addresses and acceptable mail exchanger IP addresses may be optionally stored for a number of mail domains as described above 308. A client request regarding a securities transaction is received 310 and executed 312 as described above. After being received and stored as described above 314, the data describing the transaction is used to retrieve the client's account information 316 as described above.

The client's account information is searched for the client's confirmation preference: whether the client prefers e-mail and whether an e-mail address with a domain name that is on a list of acceptable domains is available. If an e-mail confirmation is preferred 318, and if a listed domain name is available 320, the confirmation e-mail is prepared 322. If, however, either steps 316 or 318 fail, a message corresponding to the transaction such as a confirmation message is sent through alternate means 346, such as by regular mail as described above, and the means of sending the confirmation may be recorded 348 as described above.

If the account information retrieved in step 316 indicates that the client wishes to have confirmations delivered via e-mail 318 and an e-mail address exists in the account information 320, an e-mail message confirming the transaction executed in step 312 or related to this transaction or an unrelated e-mail message is prepared 322 using conventional techniques as described above.

The IP address or addresses of the master name server for the domain of the e-mail address retrieved from the account information in step 316 is obtained as described above, and the IP addresses of the mail exchanger for the domain are obtained from the master name server as described above and compared with a list of approved master server IP addresses and acceptable mail exchanger addresses 324. If the addresses match at least one approved master name server address and at least one of the mail exchanger addresses match at least one of the acceptable mail exchanger addresses 326, the method continues at step 330. Otherwise, 326, the IP address may be recorded for verification using any of the techniques described above and verified, either manually or automatically as described above 348. If the manual or automatic verification succeeds 340, the record for the domain may be updated 342 to reflect that the IP address is authorized or approved and the branch terminates 344 and otherwise 340, the branch terminates 344.

At step 330, a mail exchanger not already used may be selected 330 as described above and an attempt is made to send the message prepared in step 322. Step 330 may involve several retries to the mail exchanger. If the attempt is successful 332, the method continues at step 348, and otherwise 332, the mail exchanger is marked as used and if more authorized mail exchangers exist 336, the method continues at step 330, and otherwise the method continues at step 346.

In alternate embodiments of the present invention, the no branch of step 326 may continue at steps 330 in addition to step 340. Also, it is possible that not all of the mail exchangers are acceptable at step 326, and such mail exchangers may be recorded at step 340 and the acceptable mail exchangers used to attempt to send the message via the branch at steps 330-334. Such alternate embodiments are represented via the dashed lines near decision 326.

The above description is not intended to limit the scope of the invention, but to illustrate some embodiments of the invention. Variations on the embodiments will be apparent to one skilled in the art. The scope of the invention should be determined with reference to the claims set forth below, along with the full scope of equivalents.

What is claimed is:

1. A computer implemented method of sending a message, comprising:
   receiving a destination of the message to be sent after comparing at least some of the information received in response to at least one request for information about at least one server that can be used for receiving the message and corresponding to at least a part of the destination of the message, with a known set of information related to the at least the part of the destination of the message;
   sending the at least one request for information about at least one server that can be used for receiving the message and corresponding to at least a part of the destination of the message;
   receiving the information about the at least one server that can be used for receiving the message and corresponding to at least a part of the destination of the message responsive to the request;
   comparing at least some of the received information about the at least one server that can be used for receiving the message and corresponding to at least a part of the destination of the message with a known set of information related to the at least the part of the destination of the message; and
   sending the message responsive to the comparing step.

2. The method of claim 1 wherein the information comprises an IP address.

3. The method of claim 1 wherein the message is an e-mail message.

4. The method of claim 1 wherein the at least one server comprises at least one selected from a master name server and a mail exchanger.

5. The method of claim 1 wherein the sending the message step comprises:
   responsive to the comparing step indicating at least some of the information received matches at least some of the known set of information, sending the message as an e-mail message; and
   responsive to the comparing step indicating at least some of the information received does not match at least some of the known set of information, sending the message in a form other than an e-mail message.

6. The method of claim 5 wherein the message other than an e-mail message comprises a printed message.

7. The method of claim 1 wherein the receiving the information about the at least one server responsive to the request step comprises receiving at least one MX record.

8. The method of claim 1 wherein the message comprises a confirmation of a trade of at least one security.

9. A system for sending a message, comprising:
   a sender having an input operatively coupled for receiving a destination of the message to be sent after comparing at least some of the information received in response to at least one request for information about at least one server that can be used for receiving the message and corresponding to at least a part of the destination of the message, with a known set of information related to the at least the part of the destination of the message, the sender for sending at an input/output the at least one request for information about at least one server that can be used for receiving the message and corresponding to at least a part of the destination of the message received at the sender input, receiving at the input/output the information about the at least one server, and for providing at an output at least a portion of the information about the at least one server received and at least the portion of the destination;
   at least one verifier, each having a first input coupled to the sender output for receiving the at least the portion of the information about the at least one server and the at least the portion of the destination, the at least one verifier for providing at an input/output the at least the portion of the destination and receiving at the verifier input/output a known set of information, the at least one verifier for comparing at least some of the information received with a known set of information related to the at least the part of the destination of the message and providing at an output an indication responsive to the comparison; and
   wherein the sender additionally comprises at least one verification input coupled to each of the at least one verifier output for receiving the indication, the sender additionally for sending the message responsive to the indication received at each verification input.

10. The system of claim 9 wherein the information comprises an IP address.

11. The system of claim 9 wherein the message is an e-mail message.

12. The system of claim 9 wherein the at least one server comprises at least one selected from a master name server and a mail exchanger.

13. The system of claim 9:
   wherein the sender sends the message as an e-mail responsive to at least one of said each indication indicating at least some of the information received matches at least some of the known set of information, the sender additionally for providing a signal at an alternate output responsive to at least one of said each indication indicating at least some of the information received does not match at least some of the known set of information; and additionally comprising an alternate confirmation generator having an input coupled to the sender alternate output, the alternate confirmation generator for generating the message in a form other than an e-mail message responsive to the signal received at the alternate confirmation generator input.

14. The system of claim 13 wherein the message other than an e-mail message comprises a printed message.

15. The system of claim 9 wherein the information about the at least one server responsive to the request comprises at least one MX record.

16. The system of claim 9 wherein the message comprises a confirmation of a trade of at least one security.

17. A computer program product comprising a non-transitory computer useable medium having computer readable program code embodied therein for sending a message, the computer program product comprising computer readable program code devices configured to cause a computer system to:

receive a destination of the message to be sent after comparing at least some of the information received in response to at least one request for information about at least one server that can be used for receiving the message and corresponding to at least a part of the destination of the message, with a known set of information related to the at least the part of the destination of the message;

send the at least one request for information about at least one server that can be used for receiving the message and corresponding to at least a part of the destination of the message;

receive the information about the at least one server responsive to the request;

compare at least some of the information received with a known set of information related to the at least the part of the destination of the message; and send the message responsive to the computer readable program code devices configured to cause the computer to compare.

18. The computer program product of claim 17 wherein the information comprises an IP address.

19. The computer program product of claim 17 wherein the message is an e-mail message.

20. The computer program product of claim 17 wherein the at least one server comprises at least one selected from a master name server and a mail exchanger.

21. The computer program product of claim 17 wherein the non-transitory computer readable program code devices configured to cause a computer to send the message step comprise computer readable program code devices configured to cause a computer to:

responsive to the comparing step, indicate at least some of the information received matches at least some of the known set of information, sending the message as an e-mail message; and responsive to the comparing step, indicate at least some of the information received does not match at least some of the known set of information, sending the message in a form other than an e-mail message.

22. The computer program product of claim 21 wherein the message other than an e-mail message comprises a printed message.

23. The computer program product of claim 17 wherein the information about the at least one server responsive to the request step comprises at least one MX record.

24. The computer program product of claim 17 wherein the message comprises a confirmation of a trade of at least one security.

25. A computer implemented method of confirming a trade of at least one security, the method comprising:

receiving an order to trade the at least one security, the order to be confirmed by sending a message after comparing at least some of the information received in response to at least one request for information about at least one server that can be used for receiving the message and corresponding to at least a part of an e-mail address to which said confirmation may be sent, with a known set of information related to the at least the part of the destination of the message;

providing a request to execute the trade responsive to the order received;

receiving an indication of the trade, the trade having at least one price;

requesting a first set of information about a computer system corresponding to an e-mail address to which a confirmation of the trade may be sent;

receiving the first set of information responsive to the request;

providing a second set of information about the computer system corresponding to an e-mail address to which a confirmation of the trade may be sent; and sending a confirmation of the trade, said confirmation comprising a number corresponding to the price, by sending at least one selected from an e-mail message and a message other than an e-mail message, said selection responsive to at least some of the information in the first set having a correspondence to at least some of the information in the second set.

* * * * *